Aug. 12, 1969  R. KEMMETMUELLER  3,460,518
STEAM GENERATING SYSTEM AND METHOD
Filed Jan. 4, 1968  2 Sheets-Sheet 2

INVENTOR.
ROLAND KEMMETMUELLER
BY
*Steinberg & Blake*
ATTORNEYS 333,460,518
STEAM GENERATING SYSTEM AND METHOD
Roland Kemmetmueller, Pittsburgh, Pa., assignor to
Waagner-Biro A.G., Vienna, Austria
Filed Jan. 4, 1968, Ser. No. 695,649
Int. Cl. F22d 1/00; F22b 37/22
U.S. Cl. 122—7    12 Claims

ABSTRACT OF THE DISCLOSURE

A steam generating system and method which extracts heat from gases issuing from a converter. A watertubular duct means communicates with the converter to direct gases therefrom and to extract the heat from the gases, and an accumulator means communicates with the duct means to receive heated fluid therefrom. A conduit means leads directly from the accumulator means back to the duct means so that the circulation of fluid through the watertubular duct means takes place without the requirement of steam drums. The fluid in the watertubular duct means is maintained during off-blow periods of each operating cycle at substantially the same temperature as during the blow period of each cycle, so that in this way cold starts are avoided.

BACKGROUND OF THE INVENTION

The present invention relates to the generation of steam.

In particular, the present invention relates to a system and method for generating steam with heat extracted from gases issuing from a converter such as a BOF vessel.

Known systems of this general type are very expensive to build and involve high operating costs. Plants of this general type involve manufacturing costs of several millions of dollars. In addition, operating costs are very high because of the complex controls for such systems, the relatively large number of operators required, and because of large maintenance costs.

Thus, conventional systems of this type will include in addition to the converters and watertubular ducts for directing hot gases therefrom, such units as accumulators, condensers, pumps, steam drums, scrubbers, fuel burners, various fans and blowers, emergency stacks, and all of the pipes and valves required to interconnect such units, as well as all of the controls therefor, so that an extremely complex system of high cost with high operating and maintenance costs results. The steam drums, for example, are used to supply hot water to the watertubular ducts which extract heat from the gases issuing from the converters, but even these steam drums cannot supply fluid at a sufficiently high temperature to the watertubular ducts so that fluel burner installations are required to prevent the temperature of the watertubular ducts from falling too low during the off-blow periods. However, such fuel-burning installations are extremely inefficient so that cold starts still cannot be avoided with the result that the tubes of the watertubular ducts undergo extremely wide temperature fluctuations resulting in great stresses on the metal which forms the watertubular ducts due to expansion and contraction thereof with a resulting shortening of the life of the entire installation and with the requirement of expensive expansion joints and the like. In addition, the only economical manner to operate such fuel-fired burners is to supply them with sulphur-containing fuel, with the result that there are undesirable sulphur deposits throughout the system, and these sulphur deposits result in eventual breakdown of units such as slag-catchers, dust collectors, scrubbers, and the like, so that an emergency stack and emergency damper are essential for each converter unit to enable any given heat to be completed in the event of breakdown while a heat is in progress. Furthermore, factors of this latter type require many components to be made of stainless steel with resultant high costs and operating difficulties. Some components, such as blower impellers, for example, cannot be made of stainless steel so that they are particularly exposed to attack by the sulphur deposits.

SUMMARY OF THE INVENTION

It is accordingly a primary object of the present invention to provide a method and system which will avoid the above drawbacks.

In particular, it is an object of the invention to provide a system which is vastly superior to conventional systems while at the same time requiring far less cost not only in connection with the manufacturer of the system but also in connection with the operation and maintenance thereof.

A more particular object of the present invention is to provide a system of the above type which does not require any steam drums.

Also, a more particular object of the invention is to provide a system of the above type which will completely eliminate sulphur deposits.

Furthermore, it is an object of the present invention to provide a system wherein a plurality of boiler units can all be controlled from a single central station by one operator.

Also, it is an object of the invention to provide a method and system which will eliminate cold starts so that the stresses conventionally encountered in the tubes are greatly reduced.

In accordance with the invention, the watertubular duct means which directs gases from the converter of each boiler unit and which extracts heat therefrom is connected with an accumulator means to supply fluid thereto, and this accumulator means in turn communicates through a conduit means directly with the watertubular duct means so that in this way the requirement of steam drums is completely eliminated. The accumulator means is independently heated preferably by way of a package boiler to maintain the fluid in the watertubular duct means during off-blow periods at substantially the same temperature as during blow periods, so tht in this way excessive stressing of the tubes is avoided by eliminating cold starts and at the same time inefficient burning of fuel with unavoidable sulphur deposits are completely avoided. A plurality of the boiler units are arranged in a row with the accumulator means for all of the units situated at one end of the row where controls for all of the units are also located, so that a single control panel can be provided at a suitable pulpit for all of the units, so that in this way a single control area is provided for one operator who can control the operations of all of the units.

BRIEF DESCRIPTION OF DRAWINGS

The invention is illustrated by way of example in the accompanying drawings which form part of this application, and in which.

DESCRIPTION OF PREFERRED EMBODIMENTS

Figure 1:
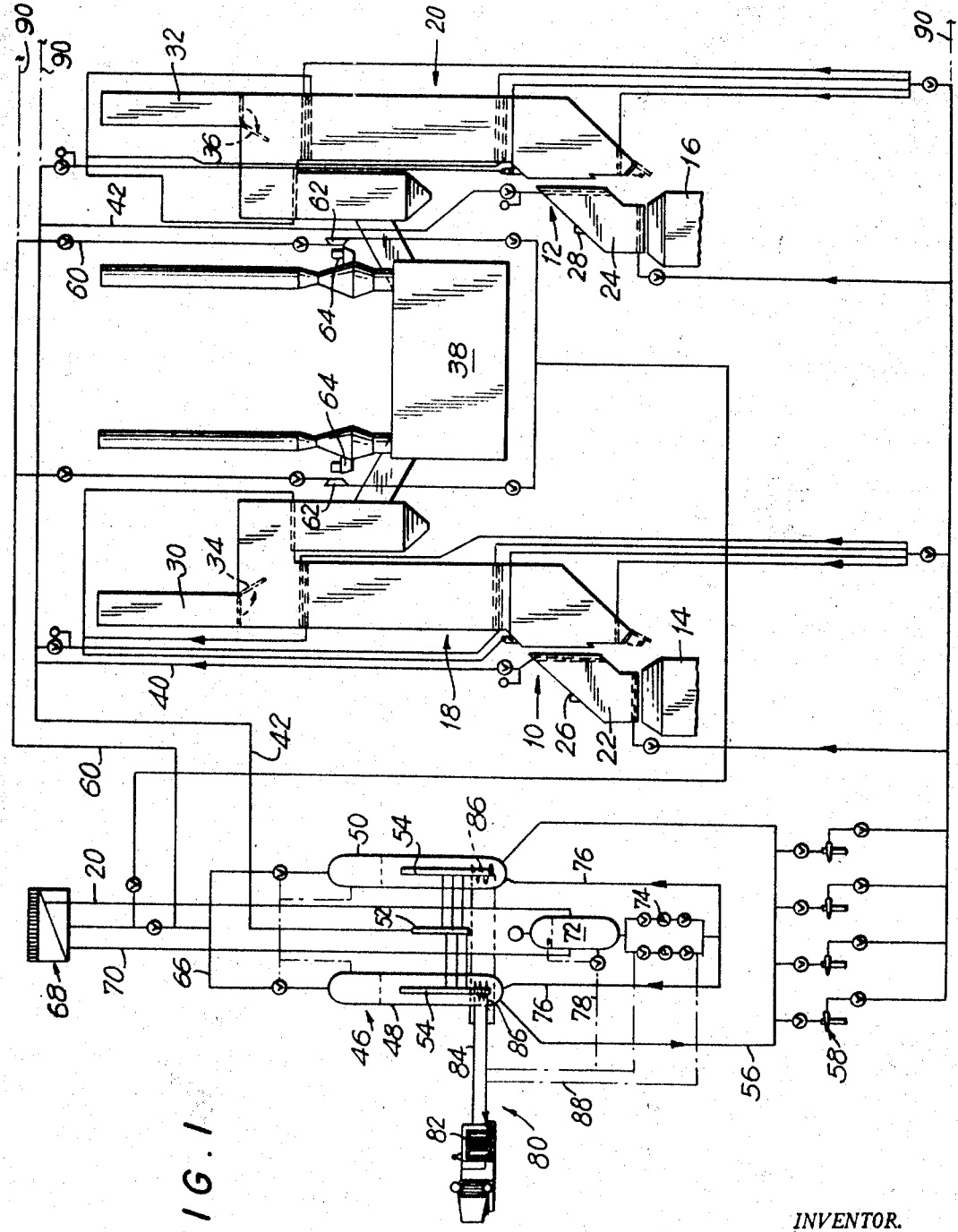
FIG. 1 is a schematic representation of one possible system according to the present invention.

Referring now to FIG. 1, there is schematically illustrated therein a pair of steam generating boiler units 10 and 12 arranged in a row one next to the other. These units respectively include converters 14 and 16 in the form of BOF vessels which are conventional. Each of these vessels is sequentially operated through uninterrupted operating cycles each of which includes a blow period followed by an off-blow period, and the latter periods of each cycle may last, for example, for twenty minutes. The gases which issue from the converters 14 and 16 during their blow periods are directed through watertubular duct means 18 and 20 respectively communicating at their lower hood portions 22 and 24 with the top ends of the converters 14 and 16. These hoods 22 and 24 are respectively provided with lance openings 26 and 28 through which lances extend to supply oxygen during the blow periods, and the cranes which operate the lances can also be used for displacing the hoods 22 and 24 to one side of the converters 14 and 16, respectively, when maintenance such as relining of the latter is required. It is to be noted in this connection that the hoods 22 and 24 consist only of the watertubular walls together with the headers and conduit connections therefor as well as the lance accommodating structure 26 and 28, so that no secondary air fans, fuel burners, or the like are connected to the hoods 22 and 24, greatly simplifying the handling of these hoods, reducing the cost thereof, and eliminating all sulphur deposits.

In the example shown in FIG. 1, the watertubular ducts 18 and 20, respectively, communicate with emergency stacks 30 and 32 capable of being opened and closed by emergency dampers 34 and 36, respectively, but since sulphur deposits are entirely eliminated such emergency stacks can also be elimnated or, if preferred, the number thereof can be reduced and a single emergency stack and damper can be operatively connected with a number of units.

The watertubular duct means 18 and 20 provide communication between the gases and such units as slag catchers, after-coolers, wet-scrubbers, and the like. For example, an after-cooler and wet-scrubber installation 38 is schematically illustrated in FIG. 1 communicating with both of the units 10 and 12.

The fluid which is heated in the watertubular walls of the duct means 18 and 20 is directed through suitable conduits 40 and 42, respectively, from headers at the ends of the watertubular walls along a pipe 42 with suitable valve controls to an accumulator means 46 which in the illustrated example consists of a pair of accumulator tanks 48 and 50. The pipe 42 communicates through suitable header assemblies 52 and 54 with the accumulators 48 and 50 of the accumulator means 46, and it is to be noted that these accumulators are in the form of vertical tanks having a considerable head of liquid therein with an equally large space over the liquid so that a considerable variation in the level of the liquid can be accommodated without any undesirable influence on the operation. These accumulators may have built in cyclones for separating liquid from the gas, and the small liquid surface area is also of considerable advantage.

In accordance with one of the important features of the invention a conduit means 56 leads directly from the accumulator means 46 back to the watertubular duct means 18 and 20, suitable circulating pumps 58 being connected to the conduit means 56, so that in this way the requirement of steam drums is completely eliminated. This advantage alone results in a very substantial saving because not only is the cost of the steam drums themselves eliminated but also the cost of all of the conduits, valves, and other controls which are required in connection with the steam drums are eliminated.

Steam can be taken from the accumulators to be used for any desired purposes. Thus, in accordance with a further feature of the invention steam from the accumulators can be directed through pipes 60 to turbines 62 for directly driving the latter, and these turbines can be operatively connected directly with air-inducing fans 64 to be used in connection with the unit 38 as well as for drawing additional air into the hoods 22 and 24 to provide for combustion of carbon monoxide. Thus, electrical motors for driving the air-inducing fans 64 can be eliminated.

Excess steam which is not required for any particular purpose is directed from the accumulator means 46 through pipes 66 to a fin-fan air-cooled condenser unit 68 situated on the roof of the building which houses the system, and the condensate from the condenser 68 is directed through pipes 70 to a condensate tank 72 from which suitable booster pumps 74 direct the condensate through pipes 76 back to the accumulator means 46.

An unillustrated feed water tank with suitable feed water pumps is connected through an inlet pipe 78, fragmentarily shown in dot-dash lines, with the condensate tank 72 in order to supply suitably treated water to the entire system as well as to make up for any losses in the liquid which circulates through the system.

In accordance with a further important feature of the invention a heating means 80 is provided for heating the liquid in the accumulator means 46, so that this liquid will be maintained at a temperature sufficiently high to prevent undesirable cooling of the watertubular walls of the duct means 18 and 20 during the off-blow period of each cycle, and in this way the temperature of the watertubular walls can be maintained substantially constant at all times, thus avoiding cold starts as well as undesirable stressing of the tubes due to excessive heating and cooling thereof. The heating means 80 preferably takes the form of a package boiler 82 having pipes 84 which pass through the walls of the accumulator tanks 48 and 50 in a fluid-tight manner and which communicate in the interior lower portions of the accumulators with coils 86 through which saturated steam flows, so as to heat the liquid in the accumulator means in a highly-efficient manner. As is well known heat exchange with saturated steam takes place at a far better rate and at far greater efficiency than heat exchange between liquid and super-heated steam, for example, and the package boiler 82 itself operates at a very high efficiency, so that it is possible in this way to maintain the fluid flowing through the entire system at the required temperature at an extremely low cost, considerably less than the costs required for steam drums, fuel-fired burners, and the like, with all of the conduits and controls required therefor and with all the inefficiencies resulting therefrom.

Additional savings can be achieved by using for the package boiler 82 the same treated water which is used for the entire system, and in addition it is possible to use pumps of the system itself, such as one of the booster pumps 74, in order to circulate liquid through the steam boiler. This connection to one of the booster pumps 74 is shown by the dot-dash lines 88 in FIG. 1.

It is possible to locate additional boiler units in the same row as the units 10 and 12, and for this purpose additional connections 90 for such a third unit are indicated in dot-dash lines in FIG. 1. A single control pulpit for all of these units can be situated in the region of the accumulators 48 and 50 beneath the latter, for example, and because of this arrangement of such a single control area as well as the vertical arrangement of the accumulators an extremely small space is required for the entire system. In addition a single operator can control all of the units from a single pulpit provided with suitable controls and signals which indicate how the various units are operating. It is to be noted that as the number of boiler units is increased the load on the accumulator means is decreased, so that no particular difficulties are encountered in connection with the addition of converter and boiler units and the cost of any additional units is but a small fraction of the first unit because of the structure and controls already present for the existing units which can be used in common with any additional units.

If the level of the liquid in each accumulator tank rises above a given limit liquid can be drained therefrom and if it falls below a given limit liquid can be added thereto, and in addition it is a simple matter to efficiently control the package boiler 82 automatically in response to the pressure prevailing in the accumulator means above the liquid therein.

During the off-blow period of each cycle the duct means is closed to prevent issue of gas therethrough. Known gas analyzers are provided for analyzing the composition of the gases, and in the event that the toxic contents thereof rise above a limit required by a given municipality, it is possible to add additional air to the gases discharging so as to cut down on the proportion of toxic contents in the gases.

Figure 2:
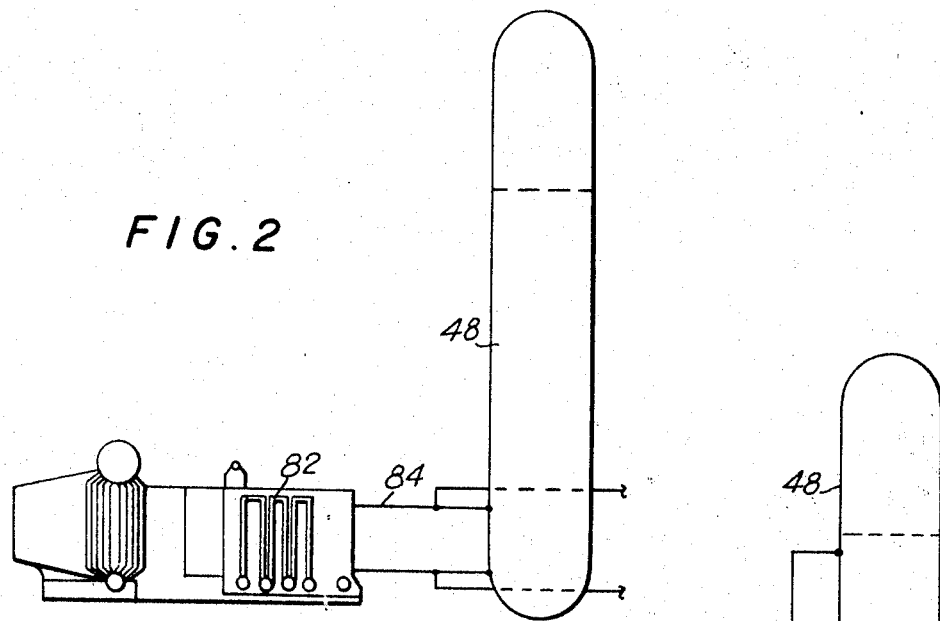
FIG. 2 is a schematic representation of another embodiment of a connection between a package boiler and an accumulator.

As is indicated in FIG. 2, the package boiler 82 may have its pipes 84 communicating directly with the liquid in the accumulator 48 as well as with the liquid in the accumulator 50 which is not illustrated in FIG. 2, so that in this way fluid from the package boiler is fed directly into the liquid of the accumulator means and liquid from the latter is circulated directly back to the package boiler. The result is an even more efficient heat transfer, but an installation as shown in FIG. 2 can only be used where the controls required for the liquid of the package boiler are substantially the same as those required for the fluid of the entire system. Where the requirements for control of the fluid of the package boiler are substantially different from those required for the fluid of the entire system, an arrangement as shown in FIG. 1 is preferred.

Figure 3:
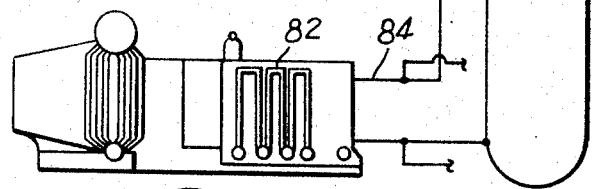
FIG. 3 is a schematic representation of a further embodiment of a connection between a package boiler and an accumulator.

The embodiment of FIG. 3 is substantially the same as that of FIG. 2 except that one of the pipes 84 communicates with an upper portion of the liquid in each accumulator while the other pipe communicates with the liquid in the lower portion of the accumulator, so that in this way the head of the liquid in the accumulator means can be used for circulating the fluid through the package boiler, although even in this case a small pump may be used if desired.

Figure 4:
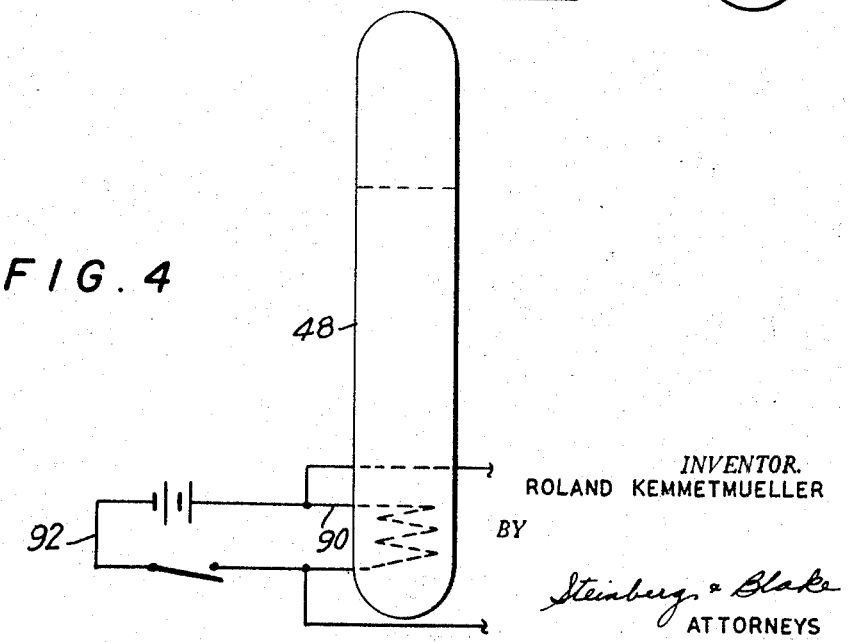
FIG. 4 shows yet another embodiment where an electrical heating means is provided for an accumulator.

As is indicated in FIG. 4, it is possible to provide a heating means for each accumulator in the form of an electrical heating coil 90 connected into any suitable control circuit 92 as schematically illustrated in FIG. 4, so that in this way it is possible where desired to provide an electrical heating means for maintaining the fluid at the required temperature.

What is claimed is:

1. In a steam generating system, a converter, watertubular duct means communicating with said converter for directing hot gases away from the latter and for extracting heat from the gases, accumulator means communicating with said duct means for receiving heated fluid therefrom, conduit means leading directly from said accumulator means back to said watertubular duct means to recirculate fluid therethrough without requiring steam drums, and heating means operatively connected to and communicating directly with the interior of said accumulator means for heating fluid therein independently of heat extracted from said gases.

2. The combination of claim 1 and wherein said heating means is electrical.

3. The combination of claim 1 and wherein said heating means includes a package boiler.

4. The combination of claim 3 and wherein said package boiler has a coil situated in the interior of said accumulator means and through which saturated steam is circulated by the package boiler.

5. The combination of claim 3 and wherein said package boiler has tubes communicating through wall portions of said accumulator means directly with the interior thereof.

6. In a steam generating system, a converter, watertubular duct means communicating with said converter for directing hot gases away from the latter and for extracting heat from the gases, accumulator means communicating with said duct means for receiving heated fluid therefrom, conduit means leading directly from said accumulator means back to watertubular duct means to recirculate fluid therethrough without requiring steam drums, heating means coating with said accumulator means for heating fluid therein independently of heat extracted from said gases, said heating means including a package boiler, and pump means operatively connected with said conduit means for pumping liquid therethrough from said accumulator means to said duct means, and said package boiler having tubes connected also with said pump means so that the latter also serves to pump liquid through said package boiler.

7. The combination of claim 3 and wherein said accumulator means includes at least one elongated vertical tank and said package boiler having tubes communicating with upper and lower regions of liquid in the tank so that the head of the liquid in the tank will contribute to circulation of liquid through the package boiler.

8. The combination of claim 1 and wherein a plurality of said converters and duct means form parts of a plurality of steam-generating units arranged in a row, said accumulator means coacting with all of said units and being situated at one end of said row and including vertically arranged tanks, said conduits means extending downwardly from said tanks and pumps connected to said conduit means for controlling the flow of liquid therethrough, whereby all of the controls for all of the units may be situated in the region of said accumulator means at said one end of said row.

9. A method of operating a steam generating system wherein a water tubular duct means communicates with a converter for directing hot gases therefrom and for extracting heat therefrom with the system having operating cycles each of which includes a blow period followed by an off-blow period, the step of circulating through the watertubular duct means during the off-blow periods of each cycle fluid which is substantially at the temperature of the fluid in the watertubular duct means during the blow periods, so that cold starts at the initial portion of each blow period are avoided.

10. The combination of claim 1 and wherein said duct means includes at the region of the converter a watertubular hood consisting only of watertubular walls, headers and conduit connections thereto, and a lance opening, so that a fuel burner is not required, thus eliminating sulphur deposits from the entire system.

11. The combination of claim 1 and wherein a turbine-driven unit communicates directly with said accumulator means to derive steam therefrom, so that an electrical drive for said unit is not required.

12. The combination of claim 1 and wherein the converter has operating cycles each of which includes a blow period followed by an off-blow period, and said conduit means maintaining communication between said accumulator means and said watertubular duct means during off-blow periods of said operating cycles as well as during blow periods thereof, so as to eliminate cold starts at the initial portion of each blow period.

(References on following page)

References Cited

UNITED STATES PATENTS

| | | | |
|---|---|---|---|
| 1,690,389 | 11/1928 | Willcox | 122—35 |
| 2,320,586 | 6/1943 | Gilli | 122—35 XR |
| 3,106,192 | 10/1963 | Hingst | 122—7 |
| 3,370,572 | 2/1968 | Kurrle | 122—7 |

FOREIGN PATENTS 966,184    8/1964    Great Britain.

KENNETH W. SPRAGUE, Primary Examiner

U.S. Cl. X.R.

122—35